United States Patent
Finnegan

(10) Patent No.: US 11,525,961 B2
(45) Date of Patent: Dec. 13, 2022

(54) CONTROL OF EPOXY DISPENSING INTO FIBER OPTIC CONNECTORS

(71) Applicant: COMMSCOPE TECHNOLOGIES LLC, Hickory, NC (US)

(72) Inventor: Samuel Taylor Finnegan, Eden Prairie, MN (US)

(73) Assignee: CommScope Technologies LLC, Hickory, NC (US)

( * ) Notice: Subject to any disclaimer, the term of this patent is extended or adjusted under 35 U.S.C. 154(b) by 48 days.

(21) Appl. No.: 17/288,443

(22) PCT Filed: Oct. 24, 2019

(86) PCT No.: PCT/US2019/057882
§ 371 (c)(1),
(2) Date: Apr. 23, 2021

(87) PCT Pub. No.: WO2020/086861
PCT Pub. Date: Apr. 30, 2020

(65) Prior Publication Data
US 2021/0396936 A1    Dec. 23, 2021

Related U.S. Application Data

(60) Provisional application No. 62/801,921, filed on Feb. 6, 2019, provisional application No. 62/749,973, filed on Oct. 24, 2018.

(51) Int. Cl.
*G02B 6/38* (2006.01)
*G01F 25/00* (2022.01)
*G05D 7/06* (2006.01)

(52) U.S. Cl.
CPC ....... *G02B 6/3802* (2013.01); *G01F 25/0092* (2013.01); *G05D 7/0623* (2013.01)

(58) Field of Classification Search
CPC .. G02B 6/3802; G01F 25/0092; G05D 7/0623
See application file for complete search history.

(56) References Cited

U.S. PATENT DOCUMENTS 5,216,485 A    6/1993  Bird et al.
5,687,092 A   11/1997  Bretmersky et al.
(Continued)

FOREIGN PATENT DOCUMENTS

CN    101356372 A    1/2009
EP    1 173 735 B1   3/2008
(Continued)

OTHER PUBLICATIONS

3-Axis E Series Automated Fluid Dispensing Robot, https://www.nordson.com/en/divisions/efd/products/automated-dispense-systems/e-series-automated-dispensing-system, Nordson EFD, 2 pages (Copyright 2021).

(Continued)

*Primary Examiner* — Sung H Pak
(74) *Attorney, Agent, or Firm* — Merchant & Gould P.C.

(57) ABSTRACT

An example method of filling epoxy in a fiber optic connector includes: applying the epoxy to a ferrule of a first connector at a first pressure for a first period of time; applying the epoxy to the first connector at a second pressure for a second period of time until the epoxy is sensed to exit a hole defined by the ferrule of the first connector; comparing the second period of time to a threshold; when the second period of time is greater than the threshold, increasing the first pressure, the first period of time, or the second pressure; and when the second period of time is less than the threshold, decreasing the first pressure, the first period of time, or the second pressure.

20 Claims, 9 Drawing Sheets

(56) References Cited

U.S. PATENT DOCUMENTS

| | | | |
|---|---|---|---|
| 6,010,740 | A | 1/2000 | Rutledge et al. |
| 6,173,864 | B1 | 1/2001 | Reighard et al. |
| 6,562,164 | B1 * | 5/2003 | Faulkner .............. G02B 6/3861 |
| | | | 156/73.2 |
| 8,029,247 | B2 | 10/2011 | Cedrone et al. |
| 9,289,920 | B2 | 3/2016 | Duinen et al. |
| 2007/0118325 | A1 | 5/2007 | Yann et al. |
| 2014/0263402 | A1 | 9/2014 | Duinen et al. |

FOREIGN PATENT DOCUMENTS

| | | |
|---|---|---|
| JP | S58-172610 A | 10/1983 |
| JP | 3-27008 A | 2/1991 |
| JP | 2000-9961 A | 1/2000 |
| JP | 2002-6171 A | 1/2002 |
| KR | 10-1383132 B1 | 4/2014 |

OTHER PUBLICATIONS

Ultimus V High Precision Dispenser, https://www.nordson.com/en/divisions/efd/products/fluid-dispensing-systems/ultimus-v-high-precision-dispenser, Nordson EFD, 2 pages (Copyright 2021).

Extended European Search Report for Application No. 19876334.4 dated Jun. 22, 2022.

International Search Report and Written Opinion of the International Searching Authority for International Patent Application No. PCT/US2019/057882 dated Feb. 12, 2020, 7 pages.

* cited by examiner

CONTROL OF EPOXY DISPENSING INTO FIBER OPTIC CONNECTORS

CROSS-REFERENCE TO RELATED APPLICATIONS

This application is a National Stage Application of PCT/US2019/057882, filed on Oct. 24, 2019, which claims the benefit of U.S. Patent Application Ser. No. 62/749,973, filed on Oct. 24, 2018, and claims the benefit of U.S. Patent Application Ser. No. 62/801,921, filed on Feb. 6, 2019, the disclosures of which are incorporated herein by reference in their entireties. To the extent appropriate, a claim of priority is made to each of the above disclosed applications.

SUMMARY OF TECHNOLOGY

During fiber optic connector manufacturing, epoxy is typically deposited inside a connector before a fiber optic cable is inserted into the connector. The fiber optic connector can include a ferrule, and the fiber optic cable includes an outer coating and an inner light transmitting portion comprised of a glass core and a glass cladding layer around the core.

The epoxy is often dispensed by a syringe including a needle that is inserted down into the fiber optic connector adjacent to an inner passage through the ferrule. The syringe and needle are then retracted, and the fiber is inserted into the connector, with a portion of the coating being removed, exposing the glass cladding layer that is inserted down into the ferrule. The epoxy holds the glass cladding layer in position within the ferrule once the epoxy is cured, such as by using heat, ultraviolet light, etc.

During manufacture of fiber optic connectors, it is important that the epoxy be properly dispensed. Too much epoxy can cause problems; so can an insufficient amount of epoxy.

DETAILED DESCRIPTION

The present invention relates to setting and control of pressures and application times for adhesives, such as an epoxy fill for connectors during manufacture and assembly of the connectors. In one example, the pressure(s) and time(s) associated with the application of epoxy to one or more previously filled connectors are used to confirm or adjust settings for filling of the next connector.

For proper epoxy fill, numerous variables influence the pressure and times needed to fill each connector. For example, the needle inside diameter can vary from syringe to syringe. The viscosity of the epoxy over the life of the syringe, which is approximately 4 hours, can change, such as increase significantly. The syringe body itself can swell over time and/or in response to the pressure that is applied. In addition, temperature and humidity in the ambient environment can affect the pressures and times needed for proper epoxy fill.

For the above reasons, it may be problematic to use the same settings for pressure and time from dispense to dispense and/or syringe to syringe.

In the interests of speeding up assembly times, automated controls of pressure and time are utilized for each connector, instead of manually operating the syringe by a technician. In one example method of epoxy fill, an initial step of relatively high pressure is used for increasing the speed at which a proper fill is achieved. A subsequent step of reduction down to a relatively lower pressure is used for fine-tuning the filling amount so that neither an underfill nor an overfill situation occurs.

In the case of an overfill, epoxy has to be wiped off a tip of the ferrule, either manually or by machine if an automated process is utilized. Sometimes this wiping action does not completely remove the epoxy, and some epoxy may be left on a portion of the connector, which can interfere with operation of the connector, or reduce connector performance. In some cases, misplaced adhesive can lead to connector failure.

In the case of an underfill, there may be insufficient epoxy dispensed to hold the glass cladding layer of the fiber. This can result in incorrect placement or damage to the fiber, again affecting performance of the connector.

Figure 1:
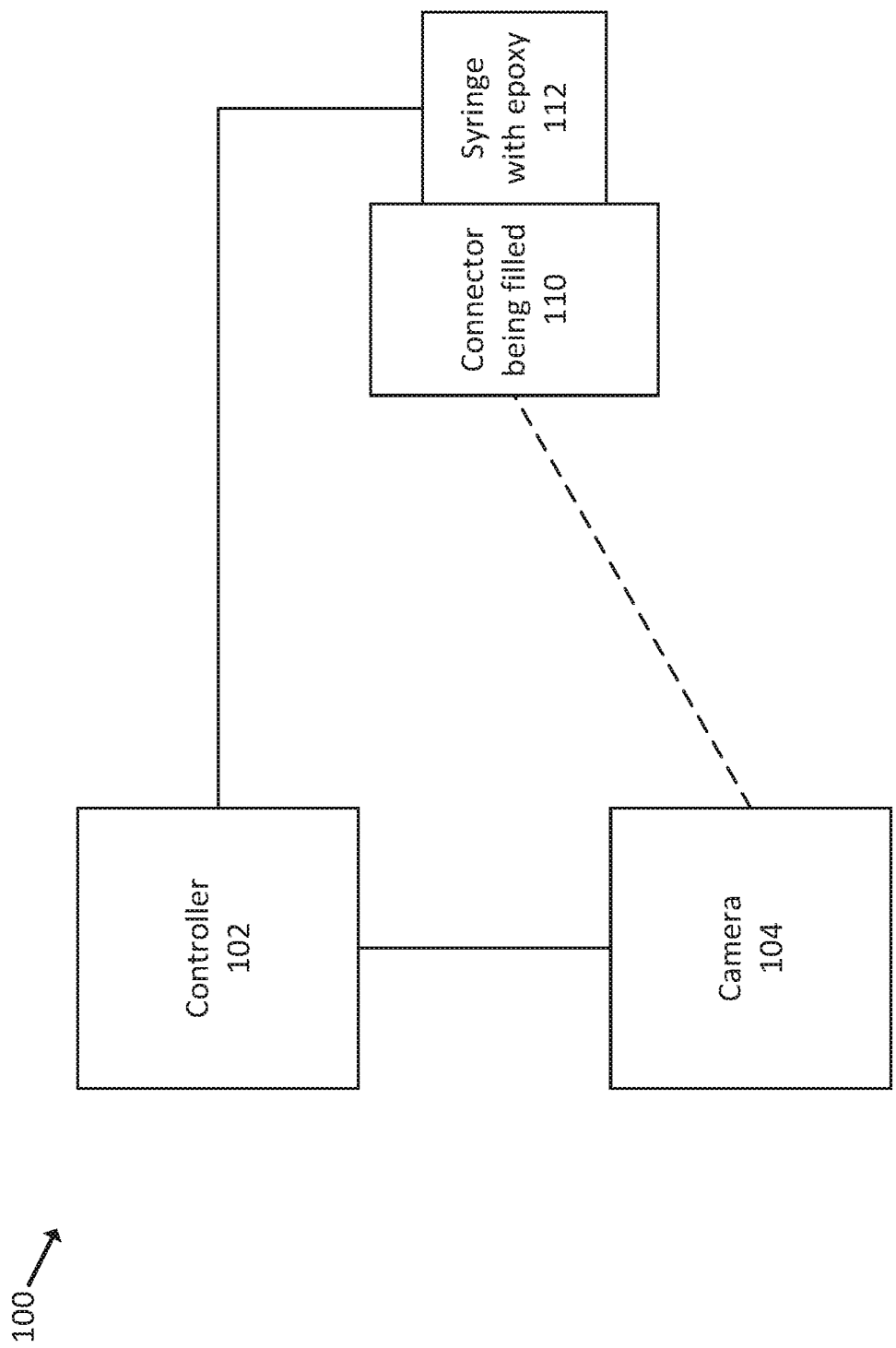
FIG. 1 shows an example system for filling fiber optic connectors with epoxy.

One system 100 in accordance with the present invention is illustrated in FIG. 1. The system 100 utilizes a controller 102 and a camera 104 to observe epoxy dispensed from a syringe 112 as the epoxy exits the tip of a ferrule 116 (see FIG. 2) of a connector 110 being filled. In addition, when a needle 114 (see FIG. 2) of the syringe 112 is pulled backwards, some epoxy may be sucked back into the ferrule 116. A vacuum can be added to assist with preventing too much epoxy from exiting the ferrule 116 at the tip.

Figure 2:
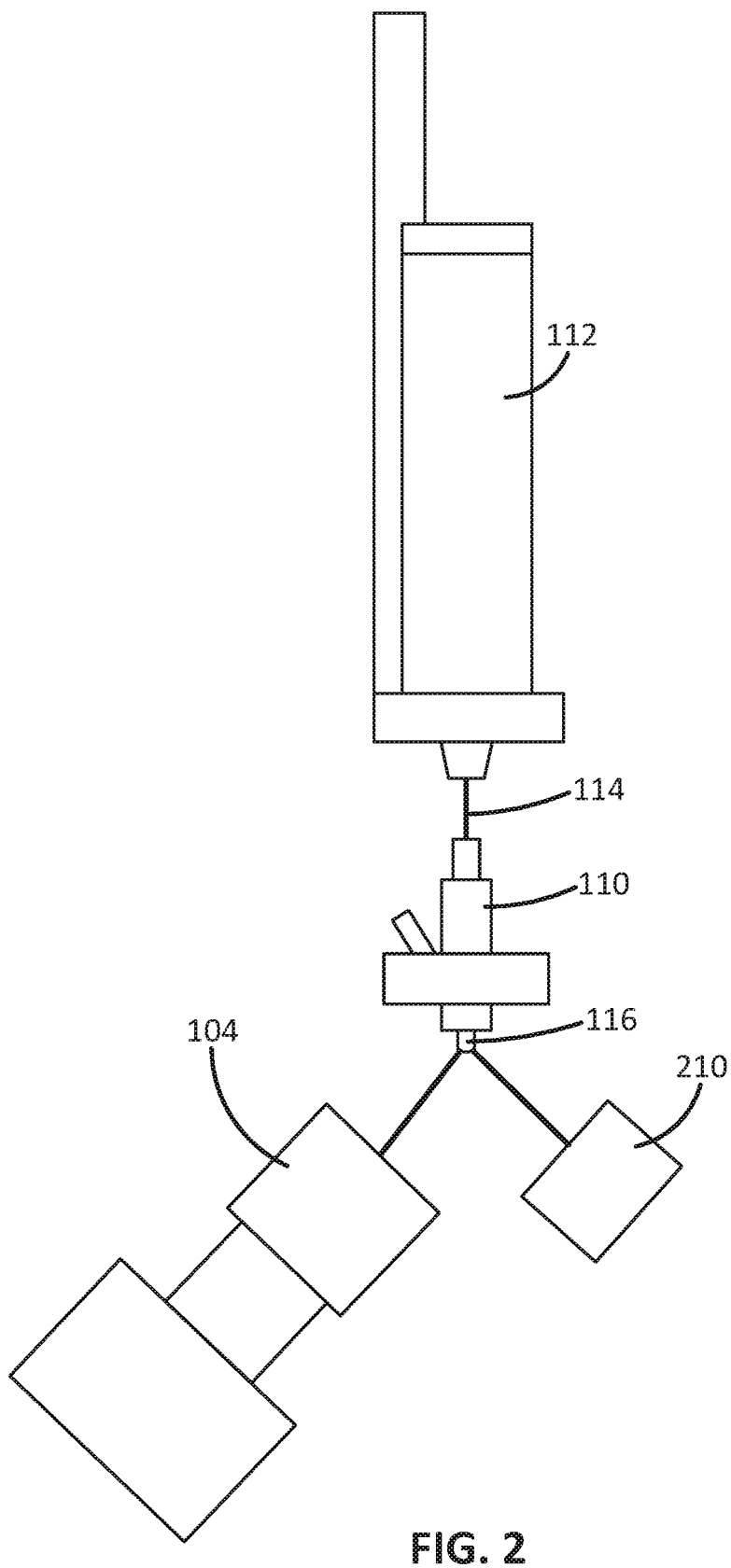
FIG. 2 shows example components of the system of FIG. 1 in a first configuration.
Figure 3:
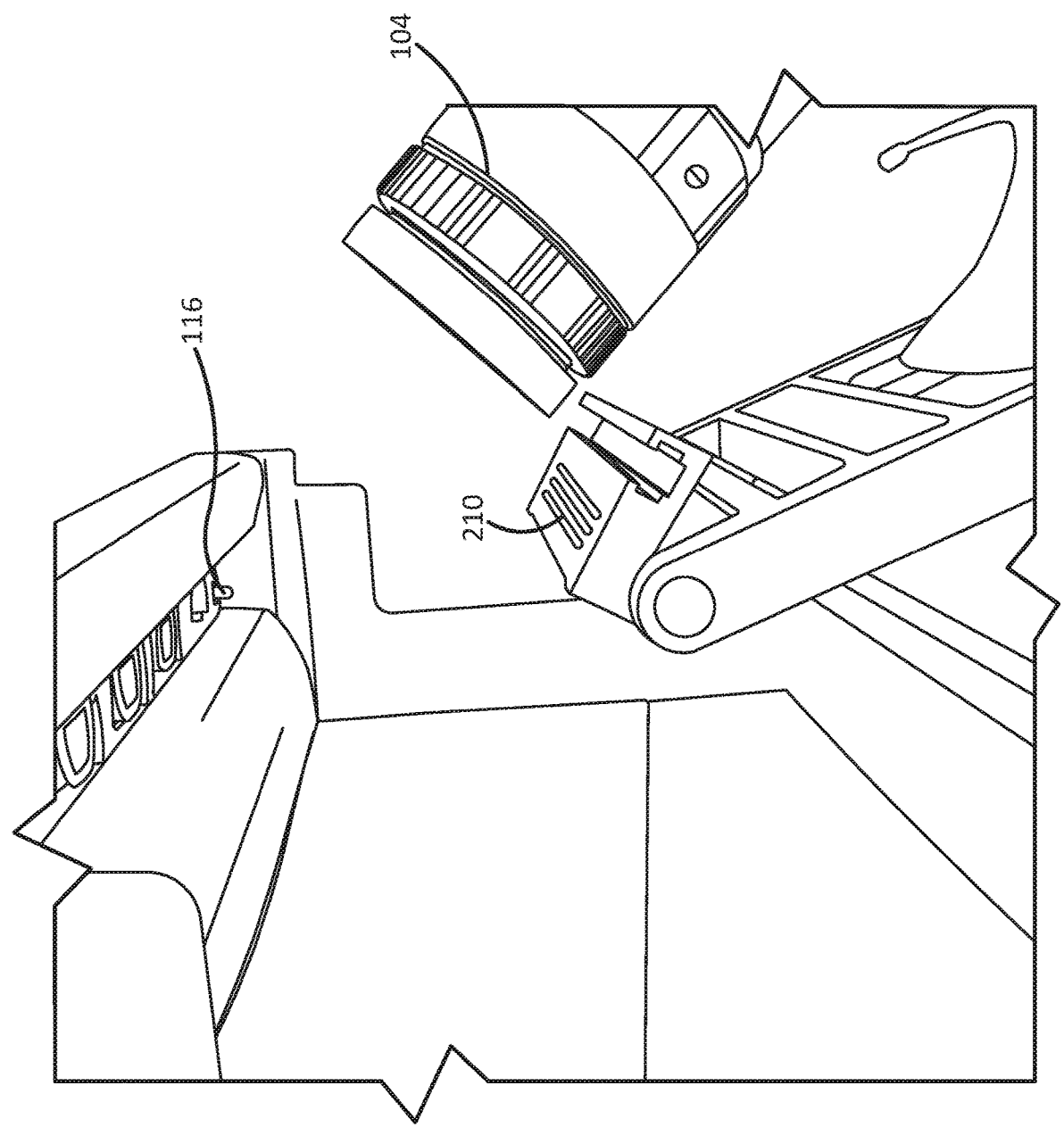
FIG. 3 shows another example of the first configuration of FIG. 2.

In one example shown in FIGS. 2-3, the camera 104 is positioned at approximately a 45 degree angle relative to a light 210 shining on the tip of the ferrule 116 of the connector 110, which is also at an opposite 45 degree angle. In this configuration, the tip of the ferrule 116 shows up as a white surface. As the epoxy is dispensed and exits through the end of the ferrule 116, the epoxy shows up as dark against the white surface of the ferrule.

Figure 4:
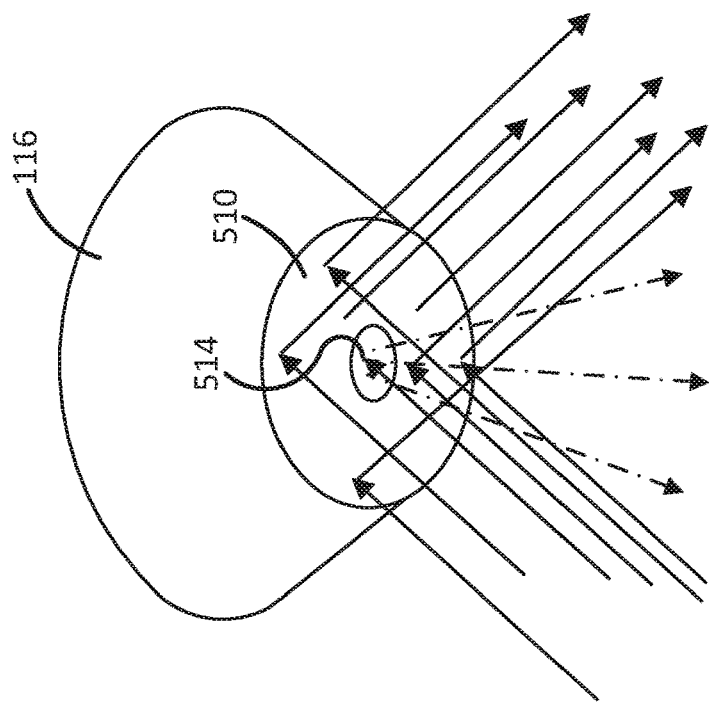
FIG. 4 shows an example of light reflected from an end face of a ferrule of a connector being filled with epoxy over time.
Figure 4:
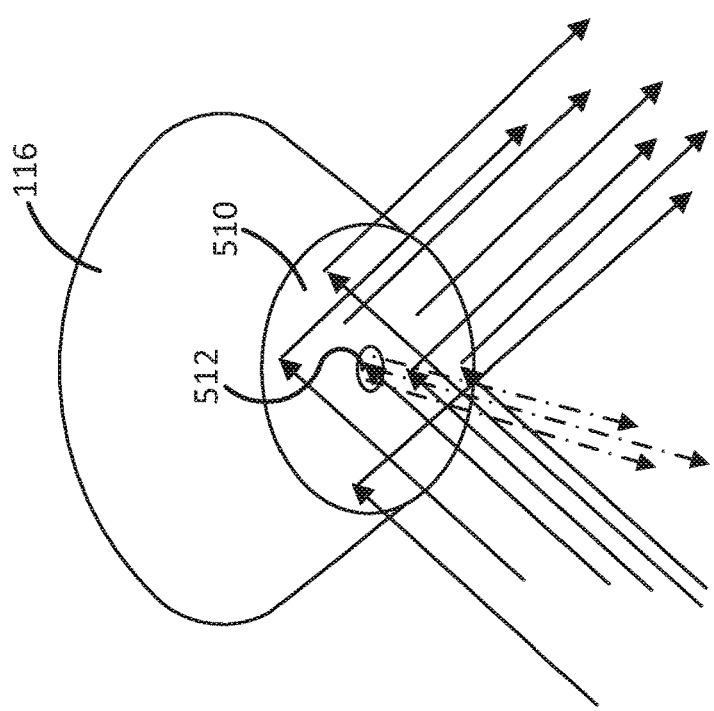
Figure 5:
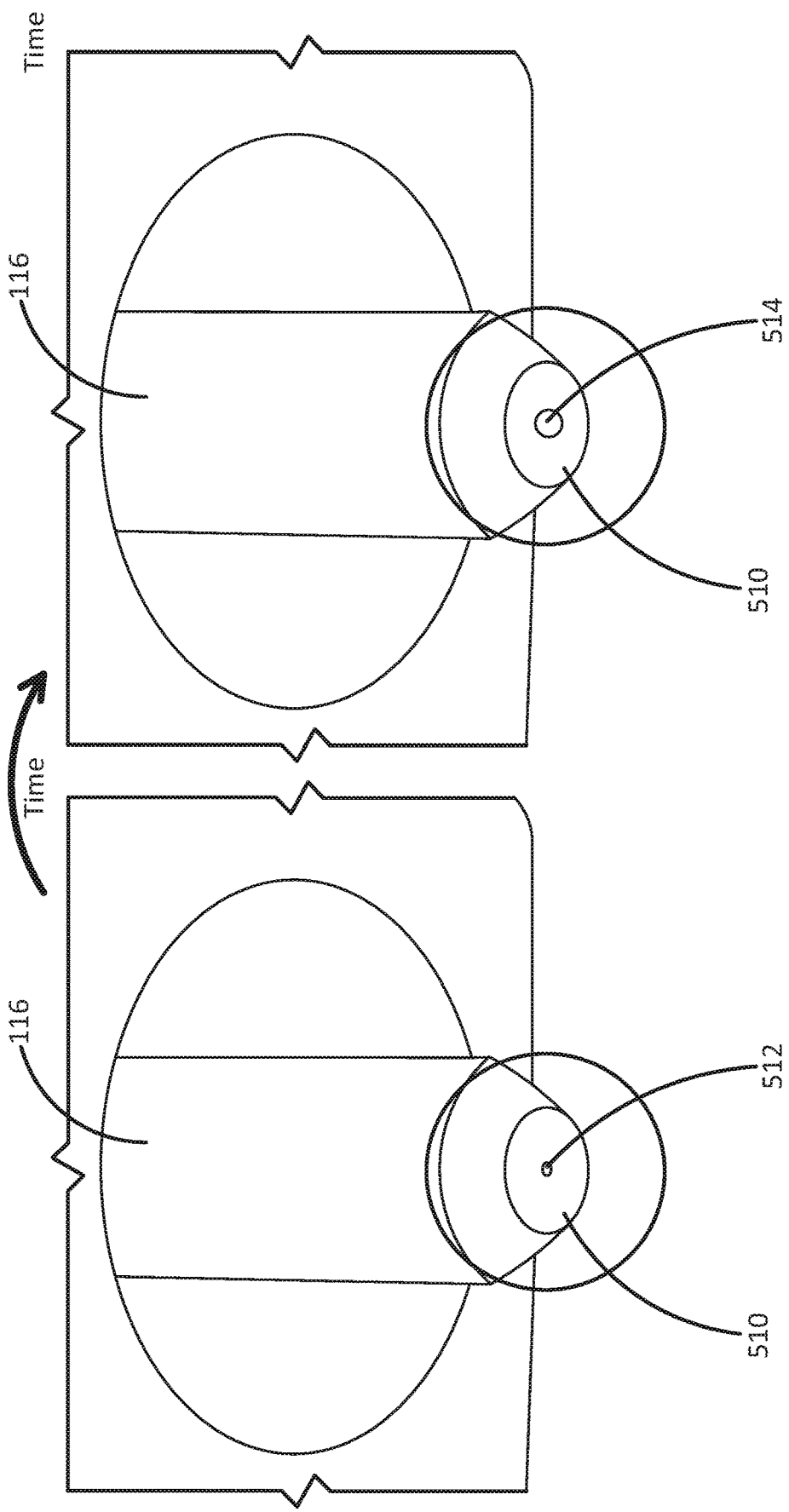
FIG. 5 shows another example of the light being reflected from an end face of a ferrule of a connector being filled with epoxy over time.

More specifically, as shown in FIGS. 4-5, the lighting makes anything not on the plane of the end face 510 of the ferrule 116 show up dark against a white surface, including an empty hole 512 in the ferrule 116. When epoxy first emerges from the hole 512, the dark area 514 surrounding the hole 512 gets larger. One mode of operation of the camera 104 is to count the number of pixels of darkened area 514 associated with the epoxy to indicate that epoxy is now extending from a tip of the ferrule 116.

Figure 6:
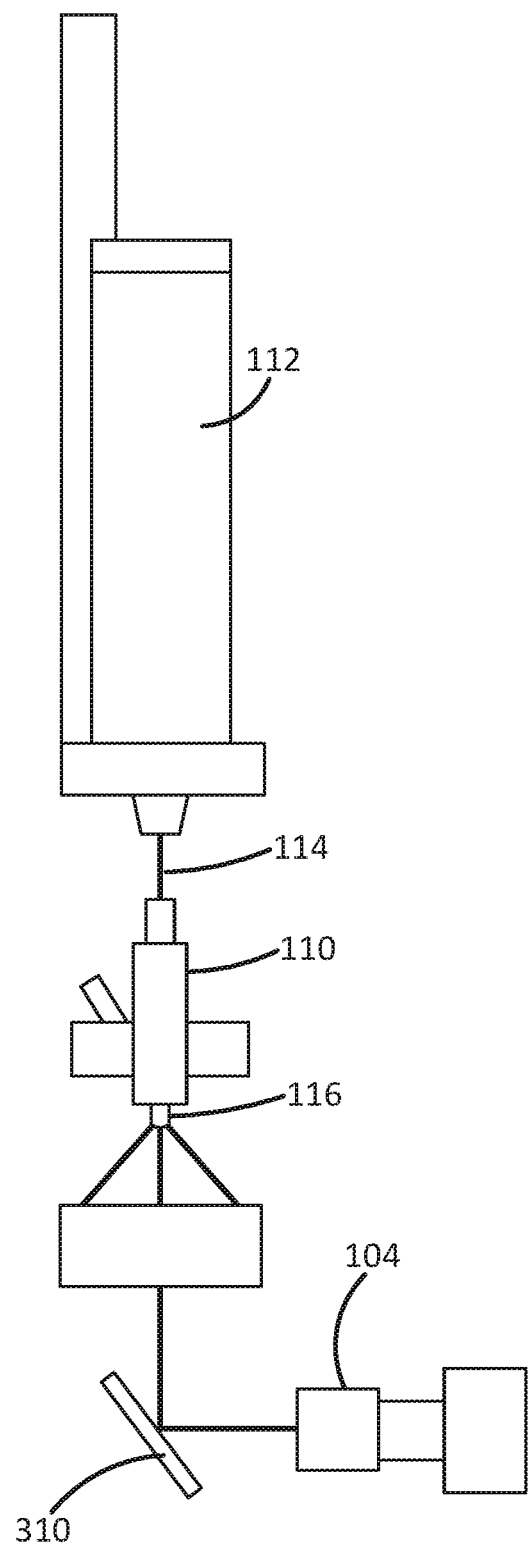
FIG. 6 shows example components of the system of FIG. 1 in a second configuration.

Various arrangements of camera and light set up are possible wherein the camera and/or the light source may not necessarily each be at 45-degree angles. For example, as shown in FIG. 6, one or more mirrors 310 (and/or other reflective surfaces) can allow for other arrangements, and a ring filter can be used to focus on the ferrule tip. In addition, other angles of light and camera viewing can be used, including axial (i.e., no angle).

Example embodiments (see FIG. 7) do not use a single pressure but rather, in the preferred example, uses a step function for the pressures utilized during epoxy fill. The higher pressure contributes to a reduced fill time, and the lower step down pressure results in higher quality and more precise fill, without excess epoxy extending from the ferrule, which would need to be wiped off.

During initial set up for a fill of connectors, the first connector may take about 10 seconds to fill, the second connector may take around 5 seconds, and the third connector is closer to the goal of around 3 seconds. In one embodiment, a goal of 2-4 seconds for epoxy fill is desired.

The following example illustrates the use of machine controls for pressure and time resulting in epoxy fill, with the epoxy amount in a predefined range between under fill and overfill.

In one example, a first pressure P1 is applied for a first time T1, and a second pressure P2 is applied for a second time T2. In this example, pressure P1 is variable, time T1 is set, pressure P2 is set, and time T2 is measured. In this example, time T2 is measured by the camera sensing when a specified amount of epoxy has exited the hole in the ferrule (such as by quantifying the number of pixels showing as a dark image as the epoxy exits the hole). Based on the time T2 measurement, adjustments are made to pressure P1.

More specifically, if T2 is too great (e.g., greater than a threshold), P1 is increased. The magnitude of the increase to P1 can be proportional to how much T2 exceeds the threshold. When T2 is significantly greater than the threshold, P1 can be increased significantly. When T2 is only slightly greater than the threshold, P1 can be increased slightly. Similarly, P1 can be decreased when T2 is less than the threshold.

More specifically, in the illustrated example, the magnitude of the changes to the parameters, such as P1, can be modified based upon a stepped format. Specifically, the magnitude of the change in T2 is compared to a series of thresholds. If the change in T2 is less than a first threshold (e.g., 0.25 seconds), no modification of P1 is made. If the change in T2 exceeds a second threshold (e.g., 0.5 seconds), the pressure is increased in a step of 0.25 psi. If the change in T2 exceeds a third threshold (e.g., 0.75 seconds), the pressure is increased in a step of 1.0 psi (4 times 0.25). A similar approach can be used to decrease P1 should the time T2 decrease. Other configurations are possible.

In general, there is a need for a lower pressure (P2) associated with the final stages of filling (T2) to allow the camera 104 to record and observe the epoxy so that epoxy is not excessively filled by the syringe 112.

In these examples, the changes to pressure P1 are made automatically by the controller based upon the fills of previous connectors. For example, the controller 102 can use a feedback mechanism that examines the time T2 for the last connector and manipulates the pressure P1 as desired to modify that time T2.

Figure 7:
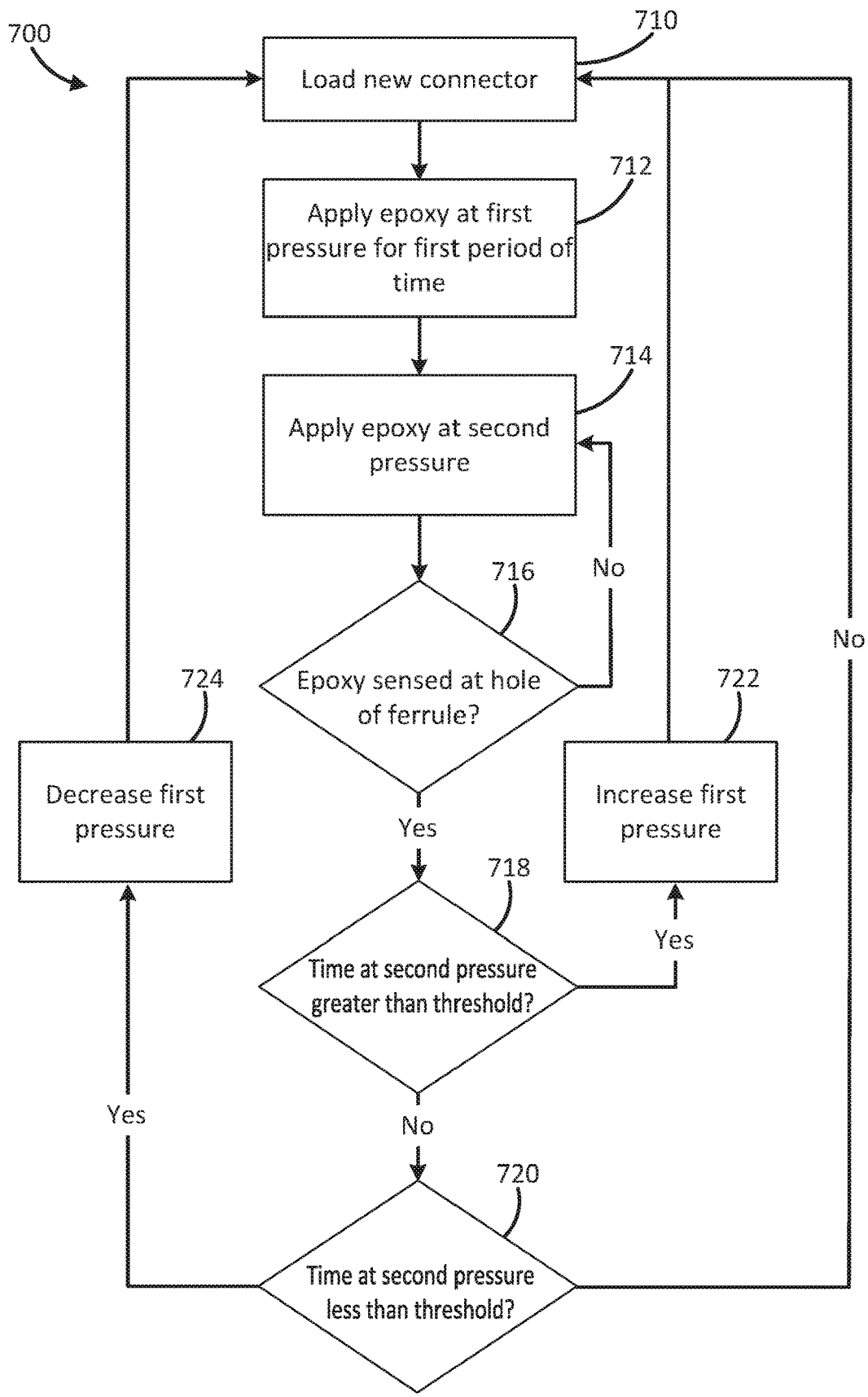
FIG. 7 shows an example method for filling a connector with epoxy.

The following is another example depicted in the example method 700 shown in FIG. 7 that illustrates this feedback. Initially, a connector is loaded (710). Pressure P1 at 30 pounds per square inch of pressure (psi) is applied for time T1 at 2.0 seconds to the syringe (712), followed by pressure P2 at 8 psi for 1.26 seconds for T2 (714) when epoxy first appears at the tip of the ferrule (716). In this example, the system attempts to normalize around 1.0 second (i.e., the threshold) for time T2 for the lower pressure P2 (718). To accomplish this, the controller will increase the pressure P1 to shorten the time T2 (722).

The next connector is loaded (710) and filled at 31 psi for pressure P1 at 2.0 seconds for time T1 (712), followed by 8 psi for pressure P2 for 0.82 seconds for time T2 (714) until the epoxy is sensed (716). The controller will thereupon decrease the pressure P1 (720, 724).

The next connector is loaded (710) and filled at 30.5 psi pressure P1 for 2.0 seconds for time T1 (712), followed by 8 psi for pressure P2 for 1.8 seconds T2 (714) until the epoxy is sensed (716). Adjustments to the pressure P1 can further be made. For example, a further connector may be filled at 30.5 psi for pressure P1 for two seconds for time T1 and 8 psi for pressure P2 or 1.1 seconds for time T2.

Although the examples described herein are directed at manipulating P1 based upon T2, alternative designs can be used. For example, T1 can be adjusted in scenarios where P1 is already at a maximum or minimum value. In another example, P2 can be adjusted to maintain a desired cycle time (with a possible acceptable loss in quality). Other configurations are possible.

In other embodiments, the pressures and times can be manipulated based upon the type of epoxy that is being dispensed. For example, instead of manipulating P1, T1 can be changed when dispensing a thicker epoxy. Such a configuration may be necessary when the pressure used as P1 reaches a maximum, thereby requiring a change in T1 for manipulation of dispensing for thicker epoxies.

Figure 8:
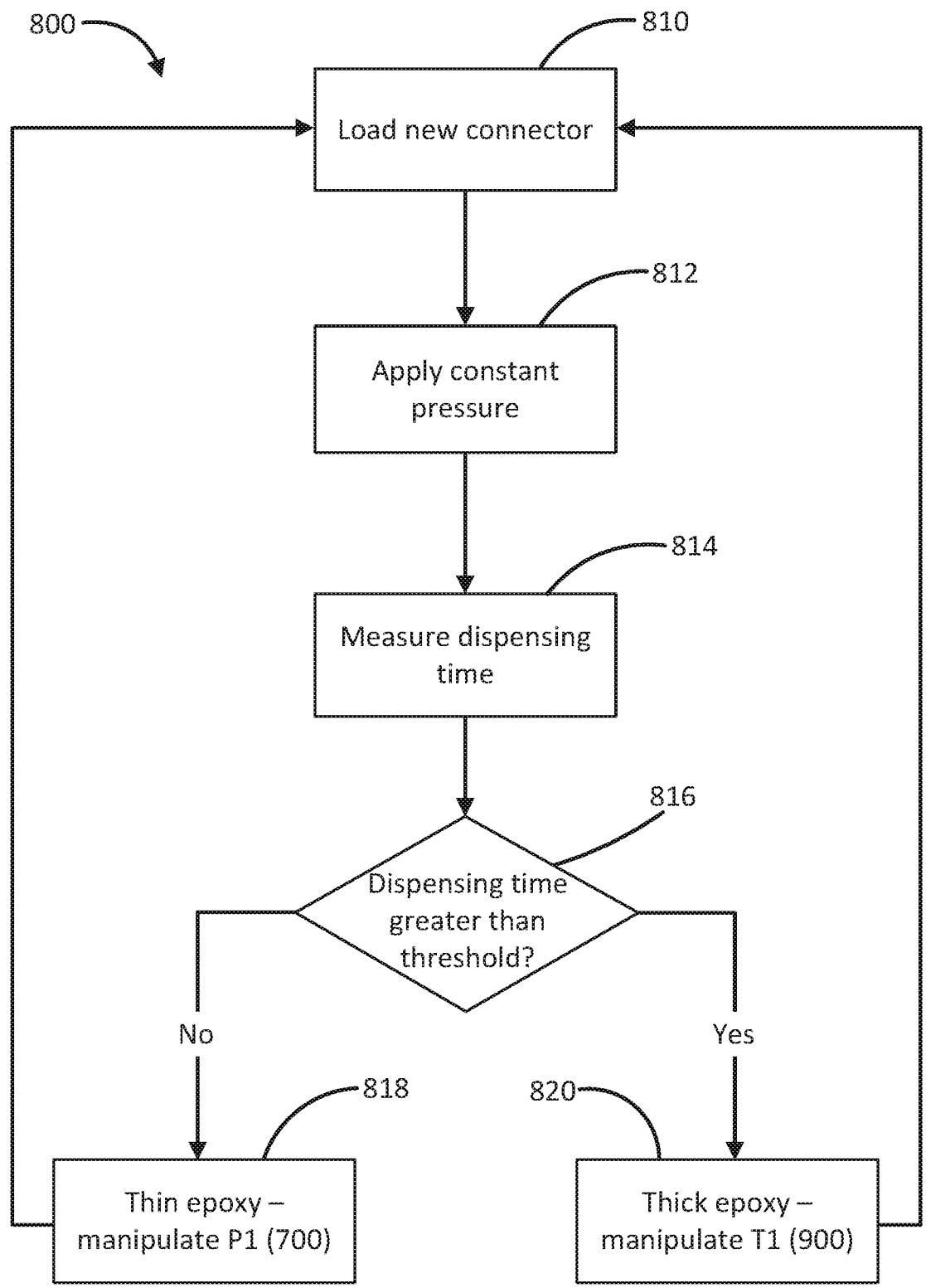
FIG. 8 shows an example method for determining a type of epoxy being dispensed.

For example, referring now to FIG. 8, an example method 800 is provided for determining the type of epoxy that is being used. This can be done, for example, each time a new syringe of epoxy is loaded.

Initially, a connector is loaded (810). Constant pressure is applied to dispense epoxy (812), and the time that it takes until the epoxy exits the ferrule is measured (814).

The time is compared to a threshold (816). If the time is less than a threshold, a determination is made that the epoxy is thin, and the method 700 of FIG. 7 is used to fill the connectors using the thin epoxy (818). Alternatively, if the time is greater than the threshold, a determination is made that the epoxy is thick, and a method 900 of FIG. 9 is used to fill the connectors using the thick epoxy (820).

Figure 9:
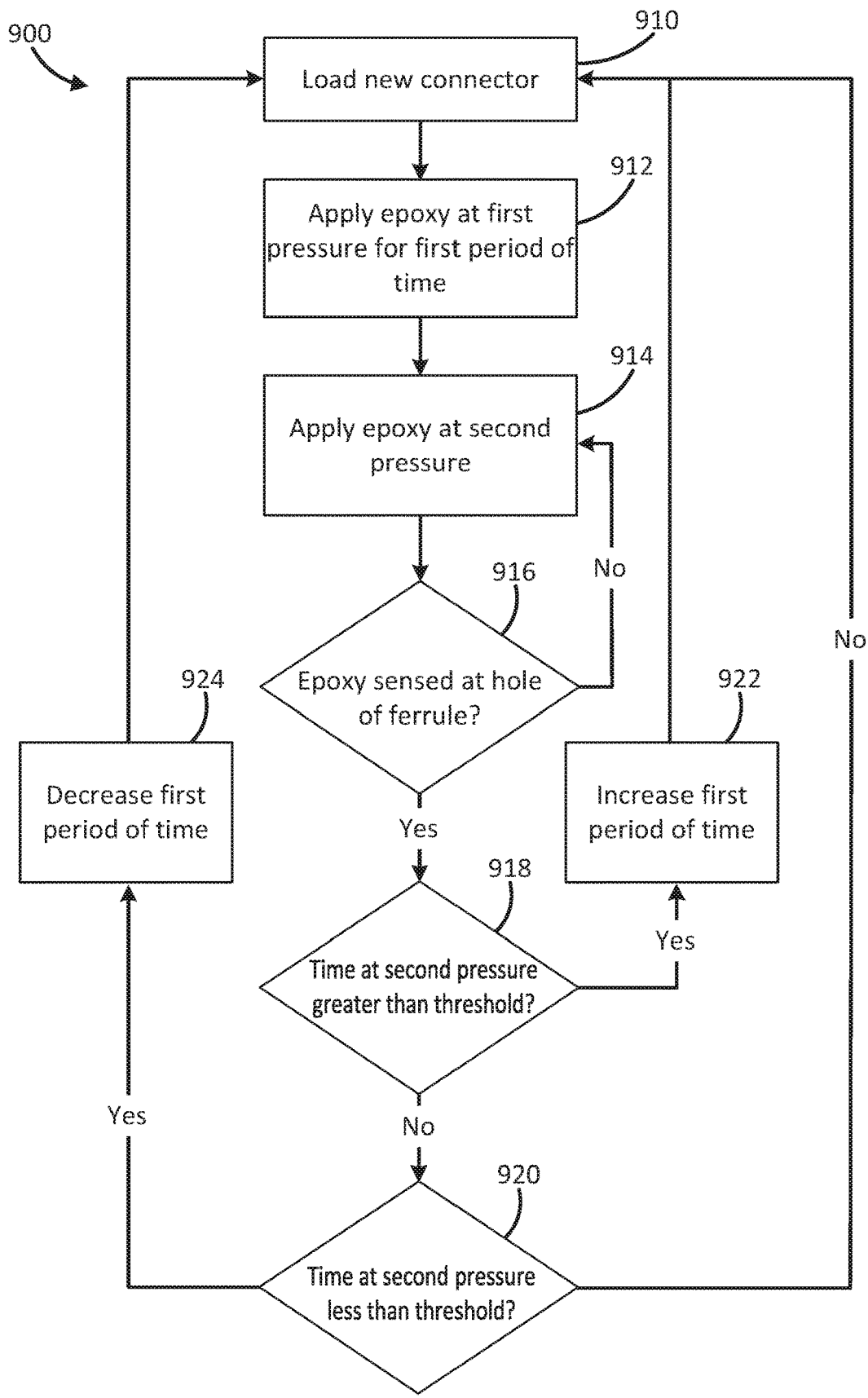
FIG. 9 shows another example method for filling a connector with epoxy.

Specifically, referring now to FIG. 9, the method 900 for dispensing the thick epoxy is shown. The method 900 is similar to the method 700, except that T1 is manipulated instead of P1. This can be advantageous because the thick epoxy can require a maximum P1 (e.g., of 90 psi) to be applied for dispensing, meaning that further increases in P1 are not possible should T2 increase.

In this example, a connector is loaded (910). Pressure P1 (e.g., at 90 psi) is applied for time T1 to the syringe (912), followed by pressure P2 (714). When epoxy first appears at the tip of the ferrule (716), the time T2 (for which P2 was applied) is compared to a threshold (918). If time T2 is greater than the threshold, T1 is increased (922). Conversely, if time T2 is less than the threshold, T1 is decreased (924).

A 3 cc syringe filled with approximately 1 gram of epoxy can be used to fill approximately 200 SC connectors over a period of approximately 4 hours. As noted above, this length of time during the epoxy fill can, by itself, impact underfill or overfill situations.

In example embodiments, the controller 102 includes at least one central processing unit and a system memory. The system memory includes a random access memory ("RAM") and a read-only memory ("ROM"). The controller further includes a mass storage device. The mass storage device is able to store software instructions and data.

The mass storage device is connected to the CPU. The mass storage device provides non-volatile, non-transitory storage for the controller. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the testing/assessment computing device 108.

The mass storage device and the RAM of the controller can store software instructions and data. The software instructions include an operating system suitable for controlling the controller. The mass storage device and/or the RAM also store software instructions and software applications that, when executed by the CPU, cause the controller to provide the functionality of the controller discussed in this document.

According to various embodiments, the controller may operate in a networked environment using logical connections to remote network devices through a network, such as a wireless network, the Internet, or another type of network. The controller also includes an input/output controller for receiving and processing input from a number of other devices, including a touch user interface display screen, or another type of input device.

What is claimed is:

1. A method of filling epoxy in a fiber optic connector, the method comprising:
    applying the epoxy to a ferrule of a first connector at a first pressure for a first period of time;
    applying the epoxy to the first connector at a second pressure for a second period of time until the epoxy is sensed to exit a hole defined by the ferrule of the first connector;
    comparing the second period of time to a threshold;
    when the second period of time is greater than the threshold, increasing the first pressure, the first period of time, or the second pressure; and
    when the second period of time is less than the threshold, decreasing the first pressure, the first period of time, or the second pressure.

2. The method of claim 1, further comprising applying the epoxy to a ferrule of a second connector at an increased pressure that is greater than the first pressure for the first period of time.

3. The method of claim 1, further comprising applying the epoxy to a ferrule of a second connector at an increased first period of time that is greater than the first period of time.

4. The method of claim 1, further comprising sensing the epoxy exiting the hole using a camera.

5. The method of claim 4, further comprising:
    capturing an end face of the ferrule of the first connector;
    determining a change in a size of a dark area on the end face over time, the dark area representing the epoxy exiting the hole; and
    determining when the size of the dark area reaches a dark area threshold.

6. The method of claim 5, further comprising counting a number of pixels associated with the dark area.

7. The method of claim 1, further comprising applying the first pressure using a step function.

8. The method of claim 1, further comprising:
    determining a type of the epoxy; and
    changing the first pressure, the first period of time, or the second pressure based upon the type of the epoxy.

9. The method of claim 8, further comprising:
    applying a constant pressure;
    measuring a preliminary dispense time;
    when the preliminary dispense time is lower than a preliminary threshold, determining that the epoxy is thin; and
    when the dispense time is higher than the preliminary threshold, determining that the epoxy is thick.

10. The method of claim 1, further comprising:
    setting the first pressure at 30 pounds per square inch; and
    setting the first time at 2 seconds.

11. A system for filling epoxy in a fiber optic connector, the system comprising:
    a camera; and
    a controller including a processing unit and memory encoding instructions which, when executed by the processor, causes the system to:
        apply the epoxy from a syringe to a ferrule of a first connector at a first pressure for a first period of time;
        apply the epoxy from the syringe to the first connector at a second pressure for a second period of time until the epoxy is sensed to exit a hole defined by the ferrule of the first connector;
        compare the second period of time to a threshold;
        when the second period of time is greater than the threshold, increase the first pressure, the first period of time, or the second pressure; and
        when the second period of time is less than the threshold, decreasing the first pressure, the first period of time, or the second pressure.

12. The system of claim 11, further comprising instructions which, when executed by the processor, causes the system to apply the epoxy to a ferrule of a second connector at an increased pressure that is greater than the first pressure for the first period of time.

13. The system of claim 11, further comprising instructions which, when executed by the processor, causes the system to apply the epoxy to a ferrule of a second connector at an increased first period of time that is greater than the first period of time.

14. The system of claim 11, further comprising instructions which, when executed by the processor, causes the system to sense the epoxy exiting the hole using the camera.

15. The system of claim 14, further comprising instructions which, when executed by the processor, causes the system to:
    capture an end face of the ferrule of the first connector;
    determine a change in a size of a dark area on the end face over time, the dark area representing the epoxy exiting the hole; and
    determine when the size of the dark area reaches a threshold.

16. The system of claim 15, further comprising instructions which, when executed by the processor, causes the system to count a number of pixels associated with the dark area.

17. The system of claim 11, further comprising instructions which, when executed by the processor, causes the system to apply the first pressure using a step function.

18. The system of claim 11, further comprising instructions which, when executed by the processor, causes the system to:
   determine a type of the epoxy in the syringe; and
   change the first pressure, the first period of time, or the second pressure based upon the type of the epoxy.

19. The system of claim 18, further comprising instructions which, when executed by the processor, causes the system to:
   apply a constant pressure;
   measure a preliminary dispense time;
   when the preliminary dispense time is lower than a preliminary threshold, determine that the epoxy is thin; and
   when the preliminary dispense time is higher than the preliminary threshold, determine that the epoxy is thick.

20. The system of claim 11, further comprising instructions which, when executed by the processor, causes the system to:
   set the first pressure at 30 pounds per square inch; and
   set the first time at 2 seconds.

* * * * *